(12) United States Patent
Andrews

(10) Patent No.: US 9,943,209 B2
(45) Date of Patent: Apr. 17, 2018

(54) COMMERCIAL WARE-WASHER EXCHANGE HEAD

(71) Applicant: JTA Industries, LLC, Stilwell, KS (US)

(72) Inventor: James T. Andrews, Stilwell, KS (US)

(73) Assignee: JTA Industries, LLC, Stilwell, KS (US)

( * ) Notice: Subject to any disclaimer, the term of this patent is extended or adjusted under 35 U.S.C. 154(b) by 622 days.

(21) Appl. No.: 14/526,256

(22) Filed: Oct. 28, 2014

(65) Prior Publication Data

US 2016/0113475 A1  Apr. 28, 2016

(51) Int. Cl.
| | |
|---|---|
| A47L 15/42 | (2006.01) |
| A47L 15/00 | (2006.01) |
| A47L 15/44 | (2006.01) |
| F16K 31/06 | (2006.01) |
| F17D 1/14 | (2006.01) |

(52) U.S. Cl.
CPC ....... A47L 15/4217 (2013.01); A47L 15/0076 (2013.01); A47L 15/4223 (2013.01); A47L 15/4274 (2013.01); A47L 15/4445 (2013.01); F16K 31/0644 (2013.01); F17D 1/14 (2013.01)

(58) Field of Classification Search
CPC .................................................. A47L 15/4217
See application file for complete search history.

(56) References Cited

U.S. PATENT DOCUMENTS

| | | | |
|---|---|---|---|
| 4,457,140 A | 7/1984 | Rastelli | |
| 4,893,478 A | 1/1990 | Kruck et al. | |
| 4,907,419 A | 3/1990 | Kruck et al. | |
| 5,209,246 A | 5/1993 | Tromblee et al. | |
| 5,347,827 A | 9/1994 | Rudick et al. | |
| 6,068,707 A | 5/2000 | Magliocca | |
| 6,178,625 B1 * | 1/2001 | Watson | B08B 3/00 |
| | | | 206/320 |
| 6,199,565 B1 | 3/2001 | Bluestone | |
| 6,904,969 B2 | 6/2005 | Mueller et al. | |
| 7,691,209 B2 | 4/2010 | Reichold | |
| 8,182,616 B2 | 5/2012 | Kuecuek et al. | |
| 8,327,862 B2 | 12/2012 | Haltmayer et al. | |
| 2008/0196751 A1 | 8/2008 | Poyner et al. | |

(Continued)

OTHER PUBLICATIONS

American Dish Service Parts Manual, Effective Apr. 2014 pp. 28.
Hobart LT-1 Dishwasher Manual, F-8314—LT-1 Dishwasher pp. 1-4.

*Primary Examiner* — Jason Ko

(74) *Attorney, Agent, or Firm* — Harness, Dickey & Pierce, P.L.C.

(57) ABSTRACT

A ware-washer control assembly includes electrical control components, an inlet water plumbing assembly, and a drain mechanism. Each of the electrical control components, inlet water plumbing assembly, and drain mechanism are contained within or attached to a housing for shipment and off-site service and distribution. The housing includes at least a first connector for attaching the housing to a ware-washer cabinet. The ware-washer control assembly further includes a plurality of connectors for connecting the electrical control components and inlet water plumbing assembly to a corresponding supply source and for connecting the drain mechanism to a drain plug assembly. Each of the first connector and the plurality of connectors are connected and disconnected by a user without tools.

14 Claims, 16 Drawing Sheets

(56) References Cited

U.S. PATENT DOCUMENTS

2009/0056356 A1   3/2009  Kempte
2013/0319481 A1  12/2013  Welch
2014/0090676 A1   4/2014  Vroom et al.

* cited by examiner

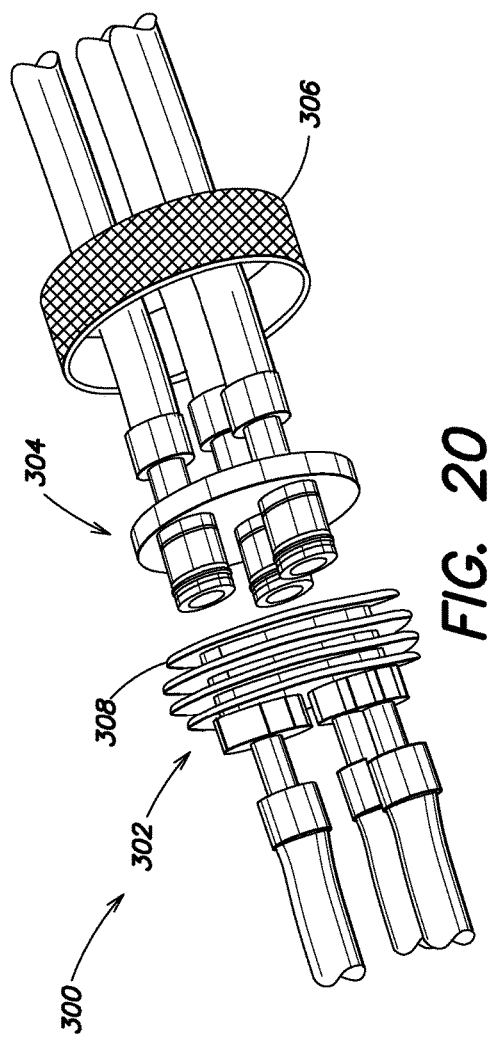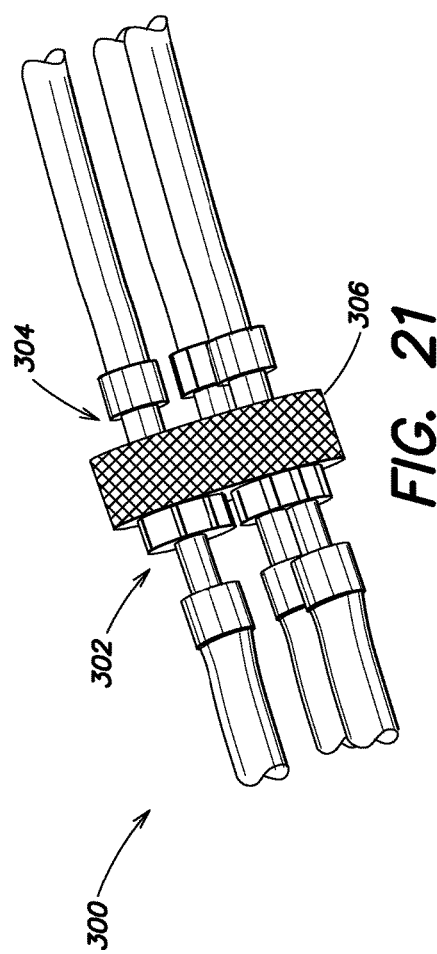

COMMERCIAL WARE-WASHER EXCHANGE HEAD

FIELD

The present disclosure relates to commercial ware-washers, especially to the maintenance and repair of parts used to control the functions of commercial ware-washers. More particularly, the present disclosure relates to a ware-washer control assembly that includes the parts that require maintenance and repair and is removable from a ware-washer without the use of tools, including mechanical, electrical, water, and chemical connections.

BACKGROUND

This section provides background information related to the present disclosure which is not necessarily prior art.

In the 1950s, ware-washing technology involved a machine, with a holding tank, pumping and heating wash water for repeated cycles. The ware-washing machine typically used a building's water supply heated to about 180° F. in a final rinse to sanitize wares, such as dishes, cups, utensils, pots, pans, and the like. A typical ware-washer included a sustainer-heater for the holding tank, dual delivery spray systems, and a booster water heater. These types of ware-washing machines are known as High Temperature (high temp) ware-washers. All of the ware-washer's pumps and heaters were permanently connected to a building's energy supply sources such as electricity, steam, or gas energy. The high temp ware-washers required continuing and intensive service to maintain acceptable operation. Providing timely repair and replacement of the ware-washers was required so that the foodservice facility could continue to operate and serve food. Such repair and replacement required maintaining a fleet of service trucks stocked with repair parts, supplies, chemicals, and also required trained personnel to repair or replace the ware-washer. The ware-washer repair businesses incurred significant costs for the truck fleet, the parts inventory, and to train and maintain reliable repairmen. The restaurant or food-service owner typically incurred repair charges for any repairs required.

Later, a new ware-washing approach developed. This new approach centered around a new type of ware-washer. This new type of ware-washer became to be referred to as a Low Temperature (low temp) Ware-Washer. The low temp ware-washer washed the wares in a batch of water. When the washing cycle finished, the batch of water was dumped to the drain and a fresh batch of water was brought into the ware-washer and used to rinse the wares and complete the cleaning. The batch of water used to rinse the wares was typically used as the wash water, in the next cycle. These low temp ware-washers typically inject chlorine or other chemicals into the batch of water, sanitizing the wares in the final rinse. In addition, there is also a rinse additive added to the batch of water facilitating a sheeting action to reduce water spotting on the wares. Also, detergent is added to the batch of water before starting the washing cycle. The low temp ware-washer typically does not require a boost heater to heat the batch of water to 180° F. because the added sanitizing chemicals provided adequate sanitization using a building's typical hot water supply at temperatures of about 120° F. Compared to high temp ware-washers, low temp ware-washers are lighter, easier to repair, do not require booster heaters, and may be operated using 120 Volt (V) power. As with the high temp ware-washers, the low temp ware-washers are permanently connected to a facility's energy and water supplies and the parts are attached to a ware-washer cabinet with nuts and bolts or other attachments requiring tools.

The low temp ware-washers have proved more reliable, use less energy than the high temp models, and have become very popular in the ware-washer industry. Ware-wash chemical supply companies have developed a system where a low temp ware-washer is provided or leased to a food service facility at low or no-cost in return for the food-service provider's promise and obligation to purchase ware-wash chemicals for use in the low temp ware-washer. The ware-wash chemical supplier typically installs the ware-washer, restocks the chemicals, and maintains and repairs the ware-washer as needed during the term of the agreement. This has become a popular option for food service providers because it reduces capital equipment costs and eliminates equipment maintenance and repair costs for the ware-washer, and saves energy costs compared to high temp ware-washers. The ware-wash chemical suppliers like the arrangement because it provides a predictable revenue stream over an extended time period and allows the cost of the ware-washer and its maintenance and repair to be amortized.

The ware-wash chemical suppliers need to provide or contract with a service provider for a fleet of trucks, stocked with parts driven by trained technicians to maintain and repair the ware-washers placed in a given territory. The cost of labor, the time required to be spent at each placement site, the cost of finding, training, and retaining personnel, and the expense of travel time between each repair site all adds up to a significant expense. In addition, it is important that repair of the ware-washers be provided promptly and essentially for 24 hours per day, seven days per week. If the food service facility cannot wash its wares it cannot stay open for business.

Thus there is a need for a ware-washer that allows for easy maintenance and repair of parts that predictably fail or need regular maintenance with a minimal need for trained repair personnel, minimal parts inventory requirements for each truck, and minimal down-time for the ware-washer.

DRAWINGS

The drawings described herein are for illustrative purposes only of selected embodiments and not all possible implementations, and are not intended to limit the scope of the present disclosure.

FIG. 20 is an exploded partial perspective of an alternate chemical line connector; and FIG. 21 shows the connector of FIG. 20 connected.

Corresponding reference numerals indicate corresponding parts throughout the several views of the drawings.

DETAILED DESCRIPTION

Example embodiments will now be described more fully with reference to the accompanying drawings.

A ware-washer in accord with the example embodiments allows a ware-washer, whether high temp or low temp, to be repaired and maintained more quickly, at a lower cost, and with a lesser need for trained repair personnel compared to prior art ware-washers. This is accomplished by providing a commercial ware-washer exchange head that includes the parts known or predicted to most often require maintenance or repair, where the exchange head is removable from the ware-washer and the separable from each of a facilities power, water, and chemical supplies without the use of tools. Such an exchange head allows an existing malfunctioning head to be quickly replaced with a functioning head in a matter of a few minutes, perhaps in as little as five minutes. The example exchange heads described eliminate any need to diagnose a malfunction and do not require the replacement of individual malfunctioning parts cutting a service call time from a typical 40-90 minutes to as little as 5 minutes.

Figure 1:
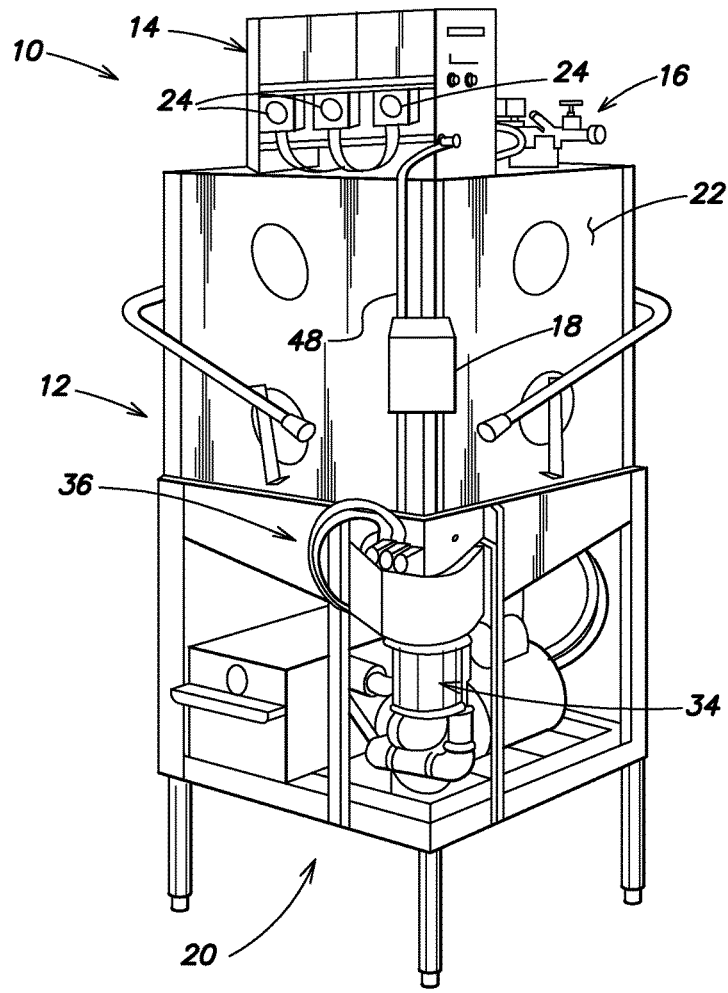
FIG. 1 is a perspective of a prior art ware-washer.
Figure 2:
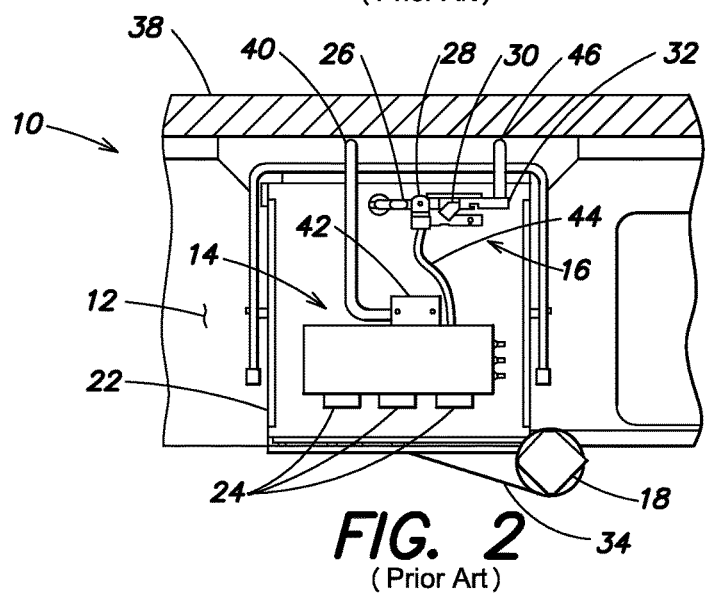
FIG. 2 is a top view of FIG. 1 installed in a facility.

FIG. 1 is a perspective view of a prior art commercial ware-washer 10, including a cabinet 12, a ware-washer control assembly 14, an inlet water assembly 16, and a drain assembly 18. The cabinet 12 is commonly referred to as an upright dishwasher and includes a recirculating pump assembly, sump assembly, and scrap trap, shown generally at 20, and held below the door assembly 22. The devices and components shown at 20 are generally reliable and need little and irregular maintenance and repair and therefore are not a part of the ware-washer control assembly described below. The ware-washer control assembly 14 may include components such as relays, wire-harness, timers, control buttons, indicator lights, chemical pumps, tubing, and the like. Most of the control assembly components are not shown but chemical pumps 24 can be seen. The inlet water assembly 16 is typically attached to the top of cabinet 12 and may include a fresh water supply tube 26, a solenoid valve 28, a line strainer 30, and a shut-off valve 32, all of which are best seen in FIG. 2. The drain assembly 18 is shown in FIGS. 1 and 2 connected to a side or corner of cabinet 12. The drain assembly 18 lifts and lowers a drain plug assembly (shown in detail at FIG. 3) for use with the fresh water assembly 34. Assembly 34 also receives chemicals from tubing 36 that is pumped from chemical pumps 24.

Referring to FIG. 2, a top view of ware-washer 10 shows the ware-washer 10 in operation in a building 38. The control assembly 14 is connected to the building's electrical supply via electrical conduit 40 and junction box 42 in a permanent manner that is not easily disassembled and disconnected. Water solenoid valve 28 also has electrical connections permanently connected to assembly 14 via electrical conduit 44. Further, inlet water assembly 16 is permanently attached to the buildings water supply at pipe 46.

Figure 3:
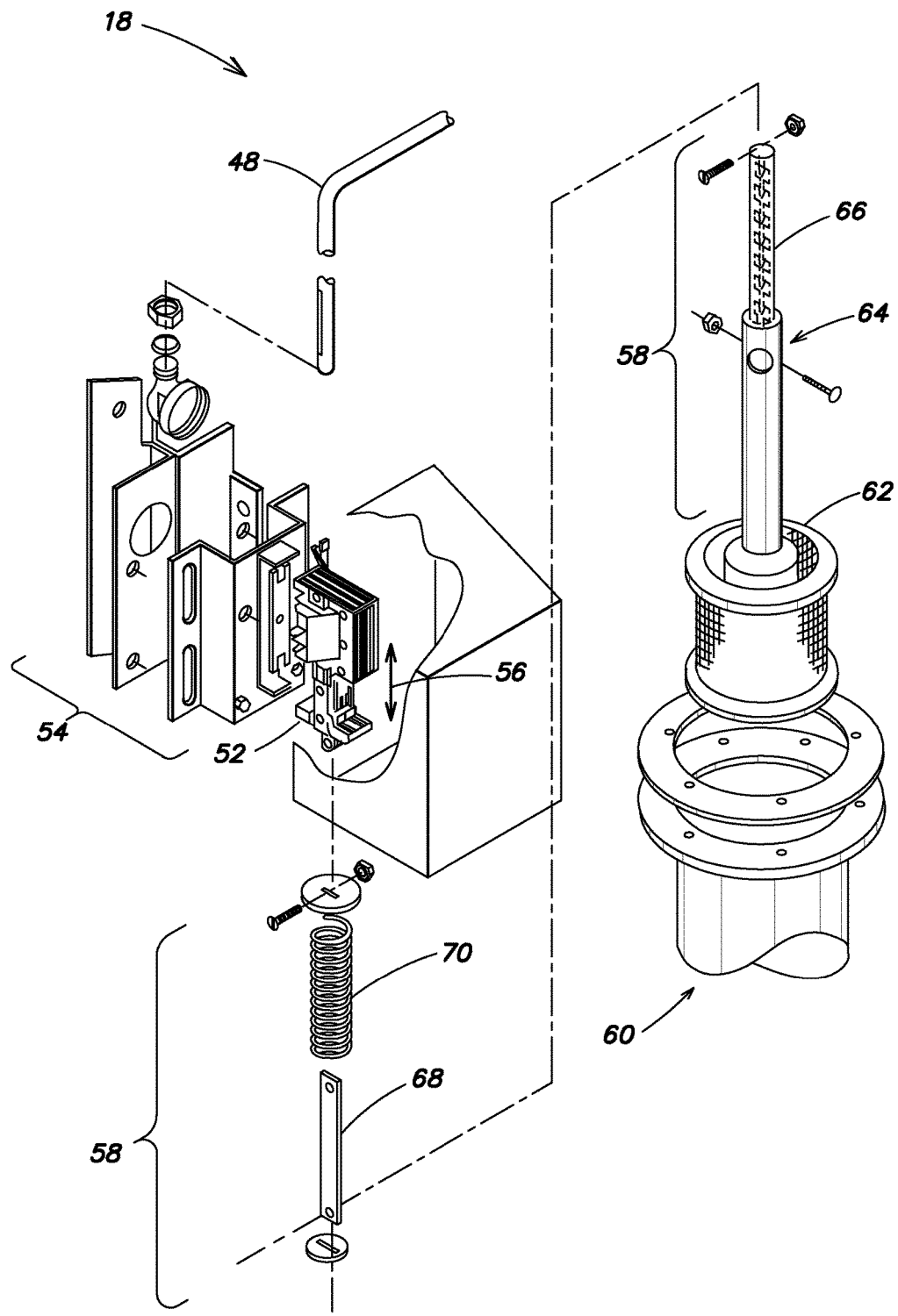
FIG. 3 is an exploded view of a portion of a prior art drain assembly.

FIG. 3 shows details of the prior art drain assembly 18. The drain assembly is controlled by and receives power from control assembly 14 via conduit 48 (also shown in FIG. 1). The drain assembly 18 includes a cover 50 that houses a linear solenoid 52 and associated parts, shown generally at 54. The control assembly 14 causes linear solenoid 52 to slide up and down, as indicated at arrow 56. The movement of solenoid 52 causes the drain plug assembly 58 to be lifted and lowered within a sump assembly shown generally at 60, including sump screen 62. The drain plug assembly 58 includes a drain tube and ball 64, a chain and cover 66, a link 68, and a spring 70.

As shown in FIGS. 1-3, a typical prior art ware-washer has various assemblies and parts distributed about and permanently attached to the cabinet 12. Each of the control assembly 14, the inlet water assembly 16, and the drain assembly 18 have parts and components requiring regular maintenance and repair. As explained above the repair and maintenance requires a lengthy and expensive service call from a trained service-person. Such repair and maintenance is particularly needed for those parts that are exposed to the corrosive chemicals typically used in connection with low temp washers. The chemical tubing 36, the drain plug assembly 58, the linear solenoid 52, the water solenoid 28 and various components of control assembly 14 all require foreseeable maintenance and repair.

The example embodiments described below provide a quick and inexpensive solution to commercial ware-washer maintenance and repair without the need for trained service personnel by containing within or attaching to a housing the components of a ware-washer that require the most maintenance and repair. The example embodiments provide a solution that requires no tools to disconnect and re-connect a control assembly to a ware-washer. This is in stark contrast to the prior art ware-washers that required significant use of tools and experienced, trained personnel to work on electrical and plumbing fixtures that were permanently attached to a building's electrical and water supplies and were attached at separate locations about the cabinet 12. Consolidating all the components onto a single control assembly and providing tool-free disassembly and re-assembly of the ware-washer components allows a malfunctioning or control assembly in need of maintenance to be quickly swapped out for a new or refurbished control assembly in a few minutes; negating the need for trained service personnel and minimizing any down time of the ware-washer.

Figure 4:
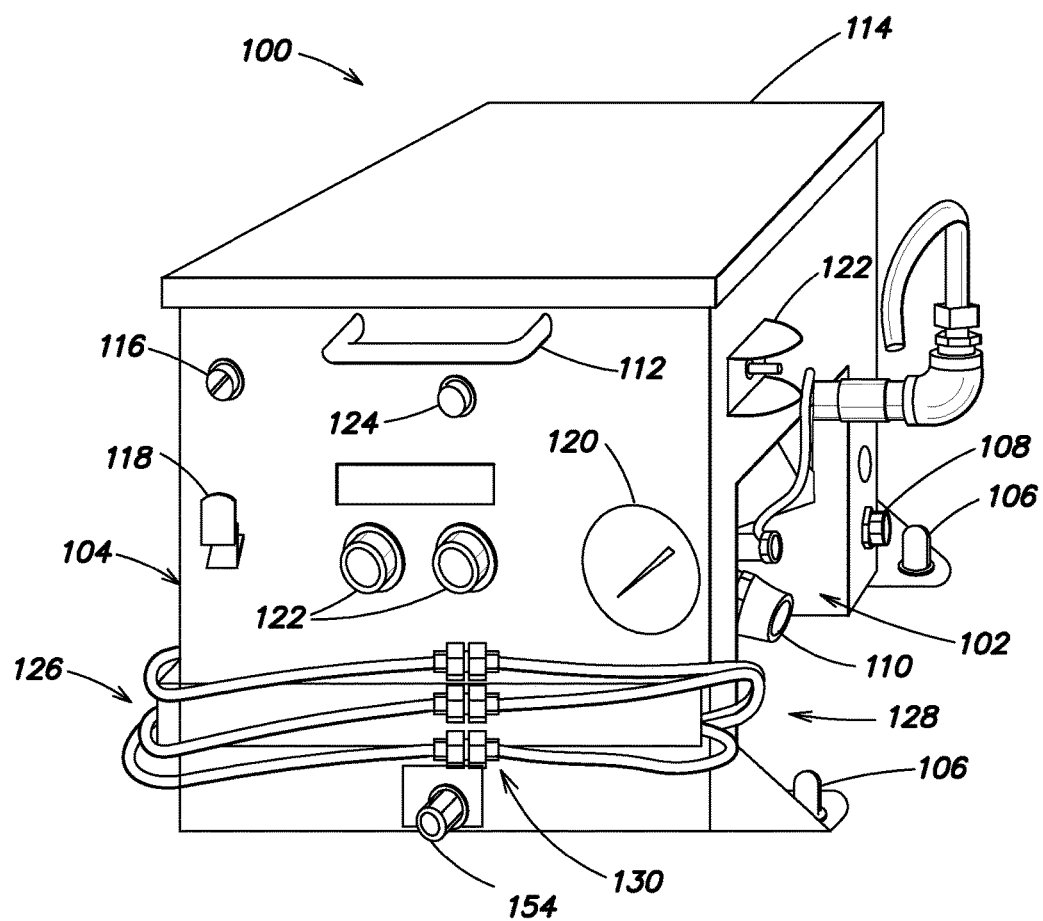
FIG. 4 is an example of a control assembly.

FIG. 4 shows a ware-washer control assembly 100 (the assembly 100 may also be referred to as an exchange head) including electrical components (shown in more detail below), an inlet water plumbing assembly shown generally at 102, a drain mechanism (packed within assembly 100 and shown in more detail below). Each of the electrical control components, inlet water plumbing assembly 102, and the drain mechanism are contained within or attached to a housing 104 (also referred to as an exchange head housing) for shipment and off-site service and distribution. The housing 104 includes at least a first connector 106 for attaching the housing 104 to a ware-washer cabinet (shown in detail below). The ware-washer control assembly 100 further includes a plurality of connectors (shown in detail below) for connecting the electrical control components and inlet water plumbing assembly 102 to a corresponding supply source (not shown) and for connecting the drain mechanism to a drain plug assembly (shown in detail below). Each of the first connector 106 and the plurality of connectors are connected and disconnected by a user without tools. The control assembly 100 may include an electrical connector 108 and may be a threaded connector or other suitable connector that is connected and disconnected without tools and a quick-connect coupling 110 for attaching the inlet water plumbing assembly to a water supply (not shown). The assembly 100 may include carrying handles 112, a lid 114. FIG. 4 also shows connection structure 116, 118 for attaching a portion of the drain mechanism to the housing 104, the details of which are described below. The housing 104 may further include gauges, switches, and indicator lights such as those shown at 120, 122, and 124. FIG. 4 is also shown with tubing 126 and 128 connected to each other for shipment to an offsite facility; such a connection prevents chemicals leaking into packaging during shipment. Typically tubing 126 is connected to a tubing manifold (not shown) for dispersing chemicals from chemical pumps contained within housing 104 and tubing 128 is typically connected to a plurality of chemical supply sources (e.g. buckets held under the ware-washer). Ensuring that each of the tubes 126 has either a female or a male quick connector and the tubes 128 has the other of the female or male quick connector allows the ends of tubing 126 to be quickly connected to the ends of tubing 128, as shown at 130. Thus, the tubing 128 for connection to the chemical source includes a chemical connector and the tubing 126 for connection to a chemical dispensing location includes a mating connector to the chemical connector such that the chemical and mating connectors may be connected to each other during shipping to prevent leakage of chemicals from the tubing 126, 128.

Figure 5:
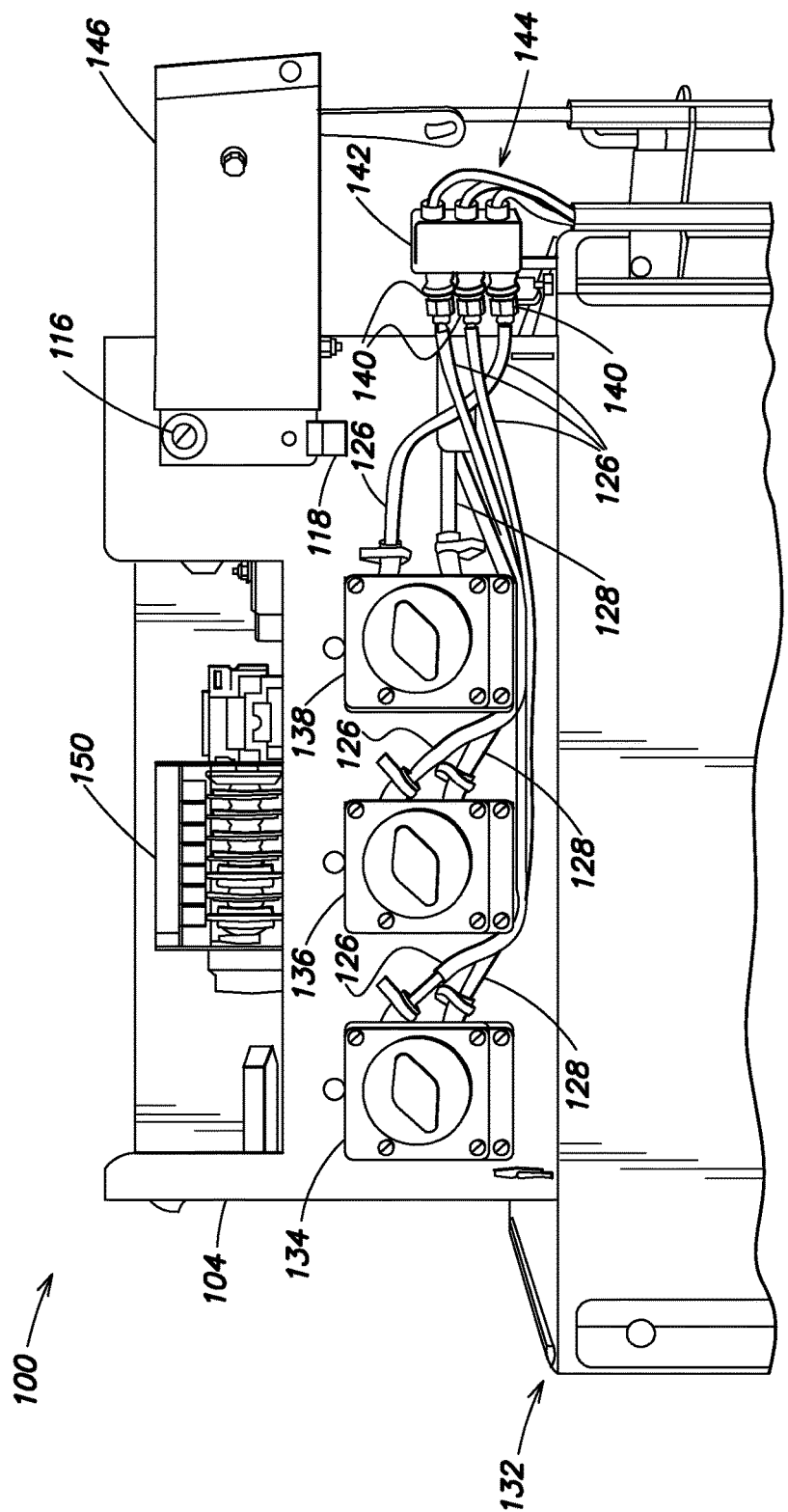
FIG. 5 is a partial front elevation of FIG. 4 installed on a ware-washer.

FIG. 5 shows a partial view of a ware-washer cabinet 132 with the control assembly 100 attached. A front of control assembly 100 is shown with the lid 114 removed to expose some electrical components held within housing 104. The control assembly may include at least one chemical dispensing unit 134 and may contain three chemical dispensing units 134, 136, 138, as shown. The chemical dispensing units may be contained within or attached to the housing 104 and tubing 128, 126 for connection to a chemical source and to a chemical dispensing location, the tubing 126 including connectors 140 that are connected and disconnected by the user without tools. As described above the connectors 140 of tubing 126 preferably mate with connectors for tubing 128 as shown and described in FIG. 4. The three chemical dispensing units may each be for dispensing one of a detergent, a sanitizer, and a rinse additive, as is known. The chemical dispensing units may be any type of pump suitable for pumping chemicals from a source to the ware-washer, such as a peristaltic pump.

FIG. 5 further shows tubing manifold 142 connected to connectors 140. The tubing manifold 142 also includes tubing 144 for transporting wash chemicals to a fresh water assembly (shown below). A drain lifter assembly 146 is shown attached to housing 104 at connectors 116, 118. Connectors 116 may be wing-nuts or other appropriate connectors that may be operated without tools. Connectors 118 may be tabs or other appropriate structure for receiving and holding the drain lifter assembly 146.

Figure 6:
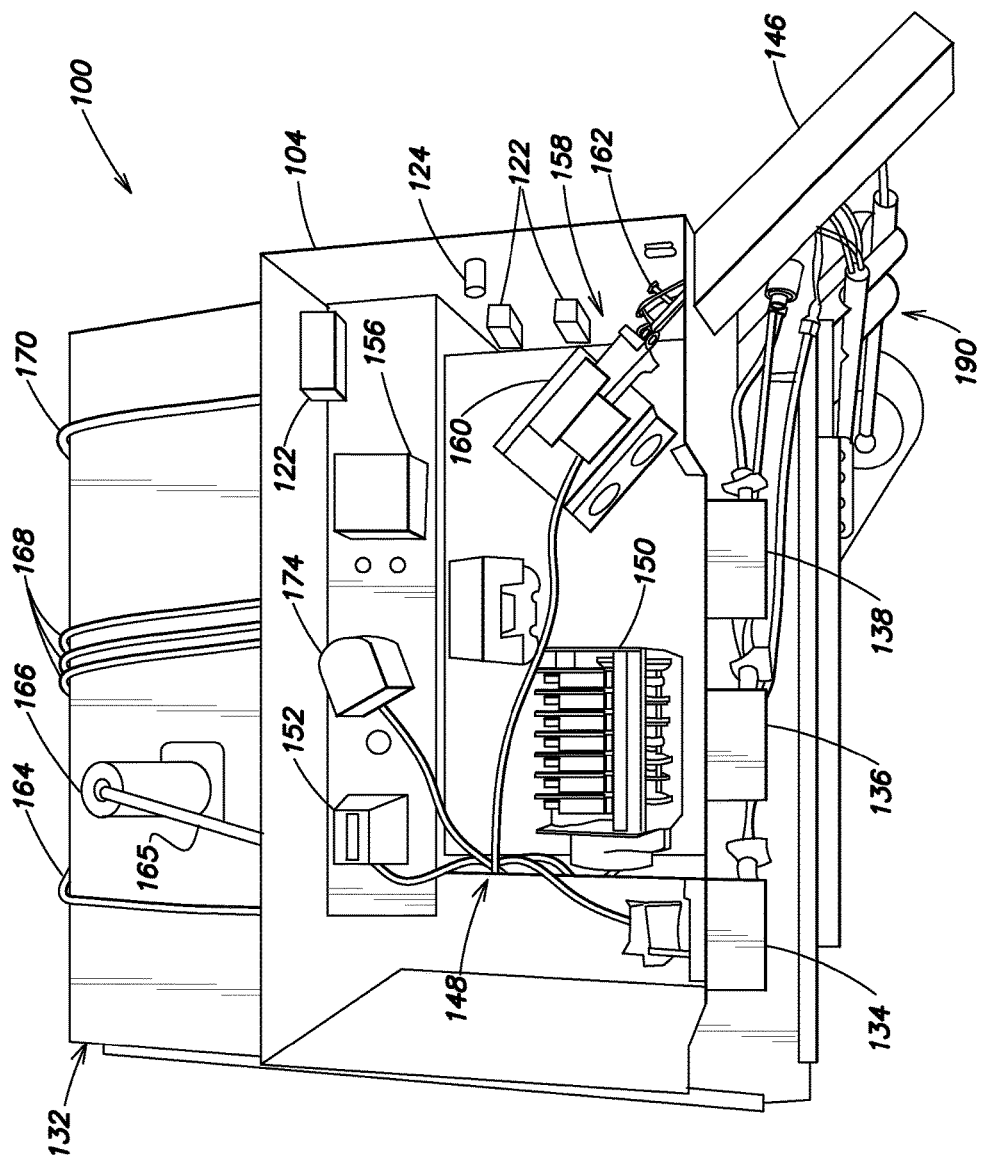
FIG. 6 is a top perspective of FIG. 5.

FIGS. 5 and 6 show the electrical components held within housing 104. The electrical components may include one or more of a wire harness shown generally at 148, a timer 150, an indicator light 124, a user-activated switch 122, a counter 152, a door cut-off switch 154 (shown in FIG. 4), and an auto-start actuator 156. FIG. 6 also shows the drain mechanism, shown generally at 158, and may include a linear solenoid actuator 160. The drain mechanism 158 may be connected to lifter assembly 146 via any appropriate connector such a pull pin 162 or other connector that may be operated without tools. FIG. 6 further shows electrical cable 164 connected to housing 104 (connection at connector 108 not shown in FIG. 6); water supply tube 165 of inlet water plumbing assembly 102 is connected to an air gap fitment 166, chemical supply tubes 168 are connected to tubing 128 via appropriate quick connectors, and water supply hose 170 is connected to the housing 104 (connection at connector 110 not shown in FIG. 6).

Figure 7:
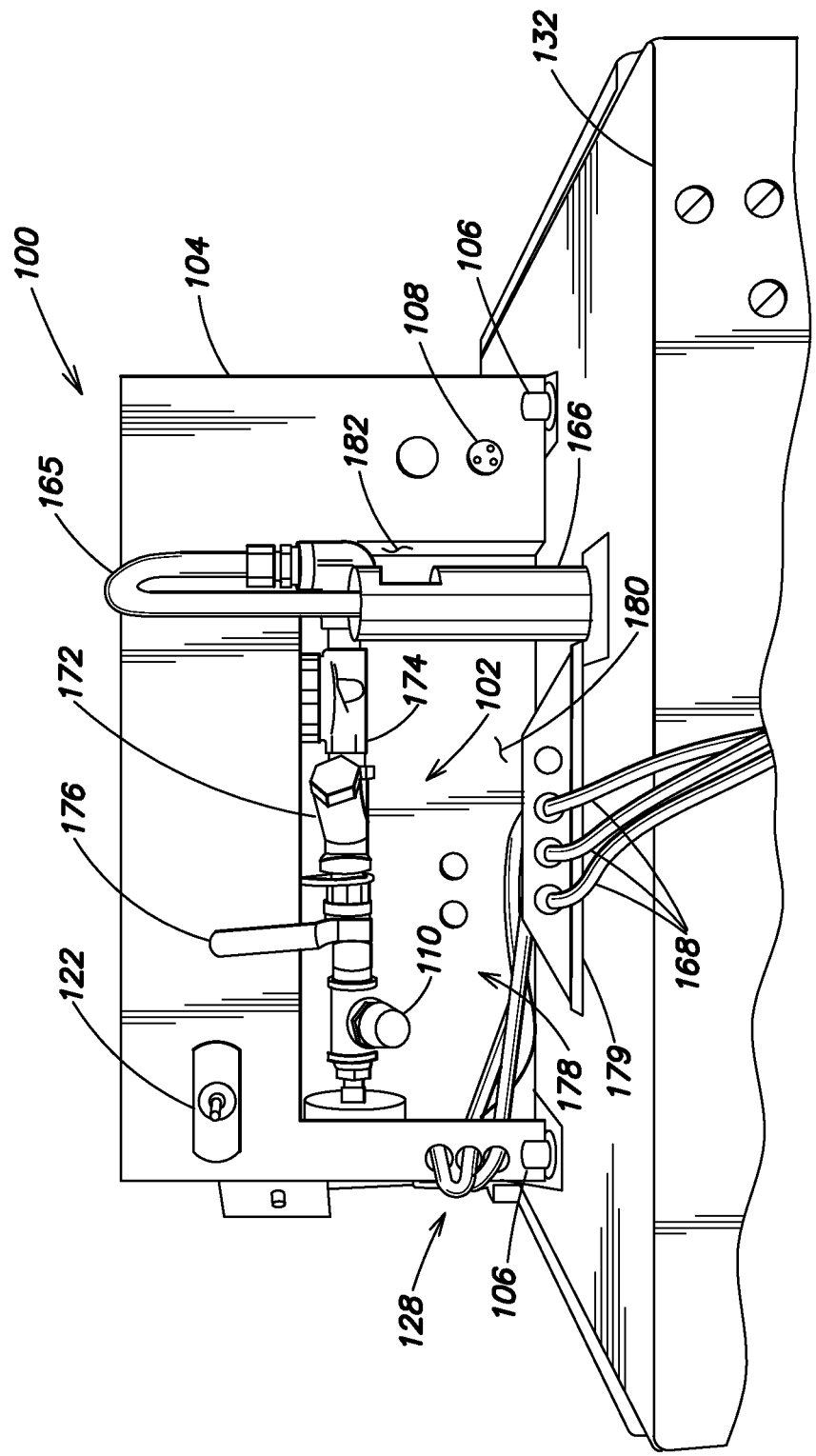
FIG. 7 is a partial rear elevation of FIG. 5.

FIG. 7 shows a back side of control assembly 100 connected to the ware-washer cabinet 132 and shows inlet water plumbing assembly 102 that may include a line strainer 172 and a water supply solenoid valve 174. The inlet water plumbing assembly 102 may further include a manual water shut-off valve 176 and the water supply tube 165. Depending on design choices and environment of use considerations, at least a portion of the inlet water plumbing assembly 102 may be separated from the electrical components by a barrier to prevent water leakage from damaging the electrical components. This separation may be the recessed area, shown generally at 178, and includes walls 180, 182. The water supply solenoid valve 174 forming a part of the inlet water plumbing assembly 102 may be positioned adjacent the electrical components within the housing 104 (best seen in FIG. 6). Partially separating the water supply solenoid valve 174 from the inlet water plumbing assembly 102 may provide a measure of protection for the water supply solenoid valve 174 from any leaking water or chemicals. Chemical supply tubes 168 are shown connected to a manifold 179.

Figure 8:
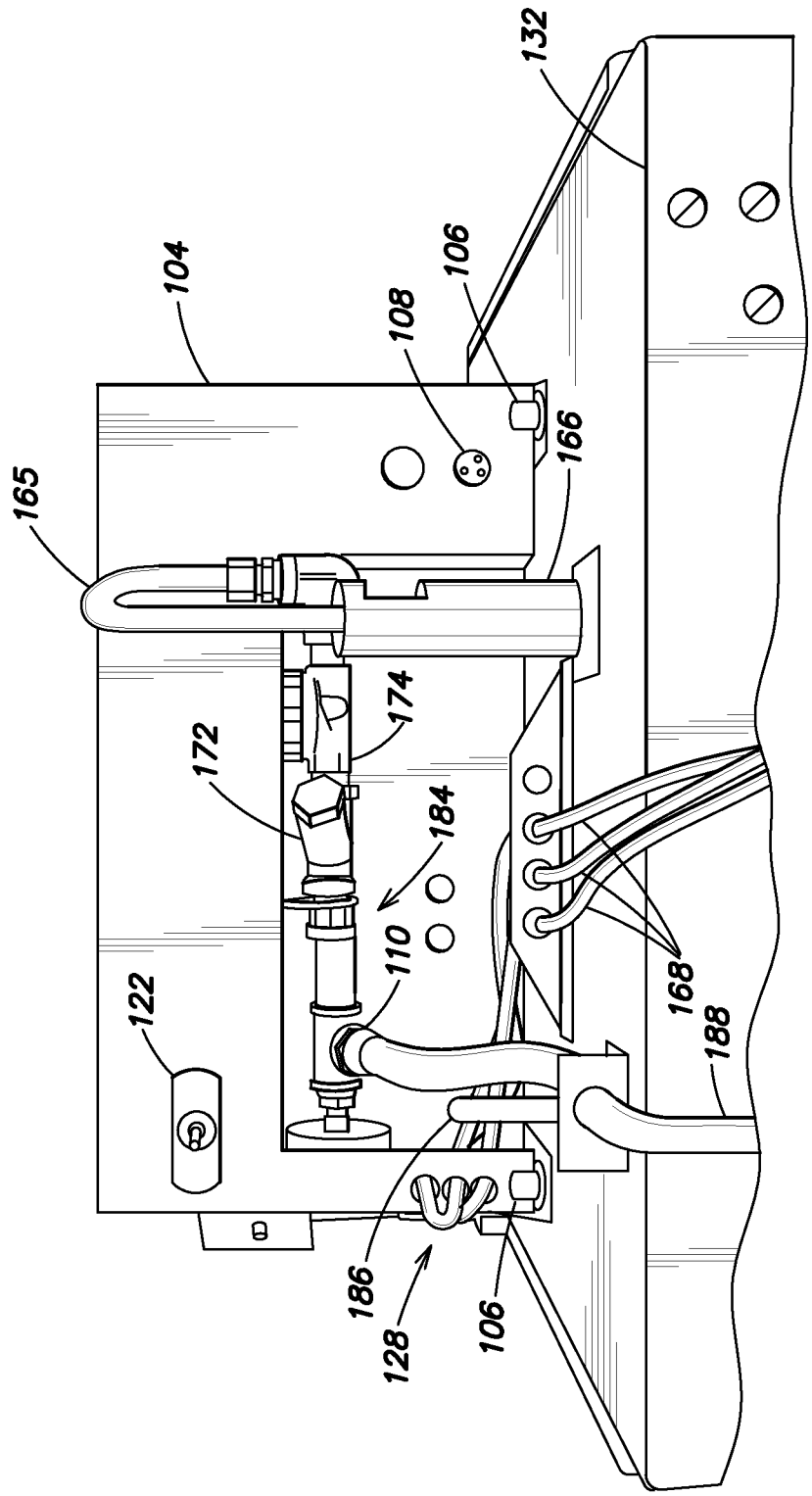
FIG. 8 is an alternate example of FIG. 7.

FIG. 8 shows an alternate inlet water plumbing assembly 184. Inlet water plumbing assembly 184 is similar to inlet water plumbing assembly 102 except that assembly 184 does not include a manual water shut-off valve 176. Rather, a manual water shut-off valve 186 is permanently attached to the ware-washer cabinet 132 and building water supply line 188.

Referring back to FIG. 6, a drain mechanism 158 is shown and may be a linear solenoid actuator 160. Drain mechanism 158 manipulates the drain lifter assembly 146 to raise and lower a drain plug assembly, shown generally at 190, to open and close a drain into a sump assembly as is known. Any suitable drain mechanism that interacts with a drain plug assembly to open and close the drain is acceptable. As described above in FIG. 3, the prior art typically attached a solenoid actuator to a side of the ware-washer cabinet with a drain plug assembly directly attached to the actuator. Placing the drain mechanism 158 within control assembly 100 required the drain lifter assembly 146 to accommodate the linear solenoid actuator's reciprocating motion to be transferred from the top of cabinet 132 around and down the side of cabinet 132, as can be seen in FIG. 6 and other drawing figures.

Figure 9:
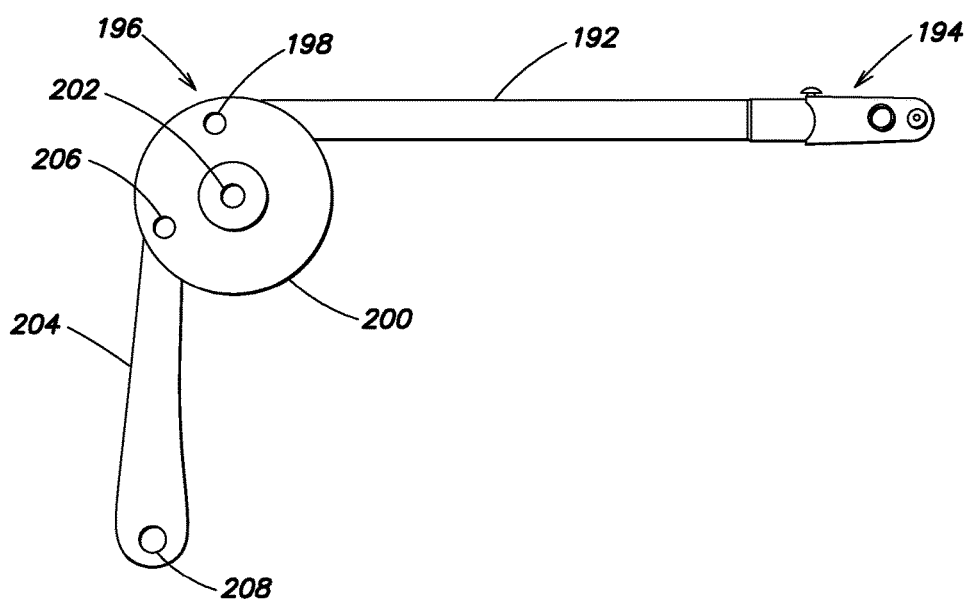
FIG. 9 is an elevation of a portion of a drain lifter assembly.

The construction of drain lifter assembly 146 may be any suitable structure that cooperates with the movement of drain mechanism 158. In the example shown, the linear, reciprocating movement of actuator 160 is transferred by drain lifter assembly 146 through the use link arms offset about a pivot point. Referring to FIG. 9, an example of a drain lifter assembly 146 is shown with the outer housing removed. Link arm 192 is connected to actuator 160 at end 194 via any appropriate quick connector such as pull pin 162 or other appropriate connector that can be operated without tools. The other end 196 of link arm 192 is pivotally connected at 198 to an outer portion of pivot disk 200. Pivot disk 200 is attached to the housing of lifter assembly 146 to pivot about center point 202. A second link arm 204 is pivotally connected at 206 to an outer portion of pivot disk 200, similarly to link arm 192. Link arm 204 in operation hangs vertically along a side or corner of cabinet 132 and when linear actuator 160 moves the eccentric connection of link arms 192 and 204 to cause link arm to move up and down.

Figure 10:
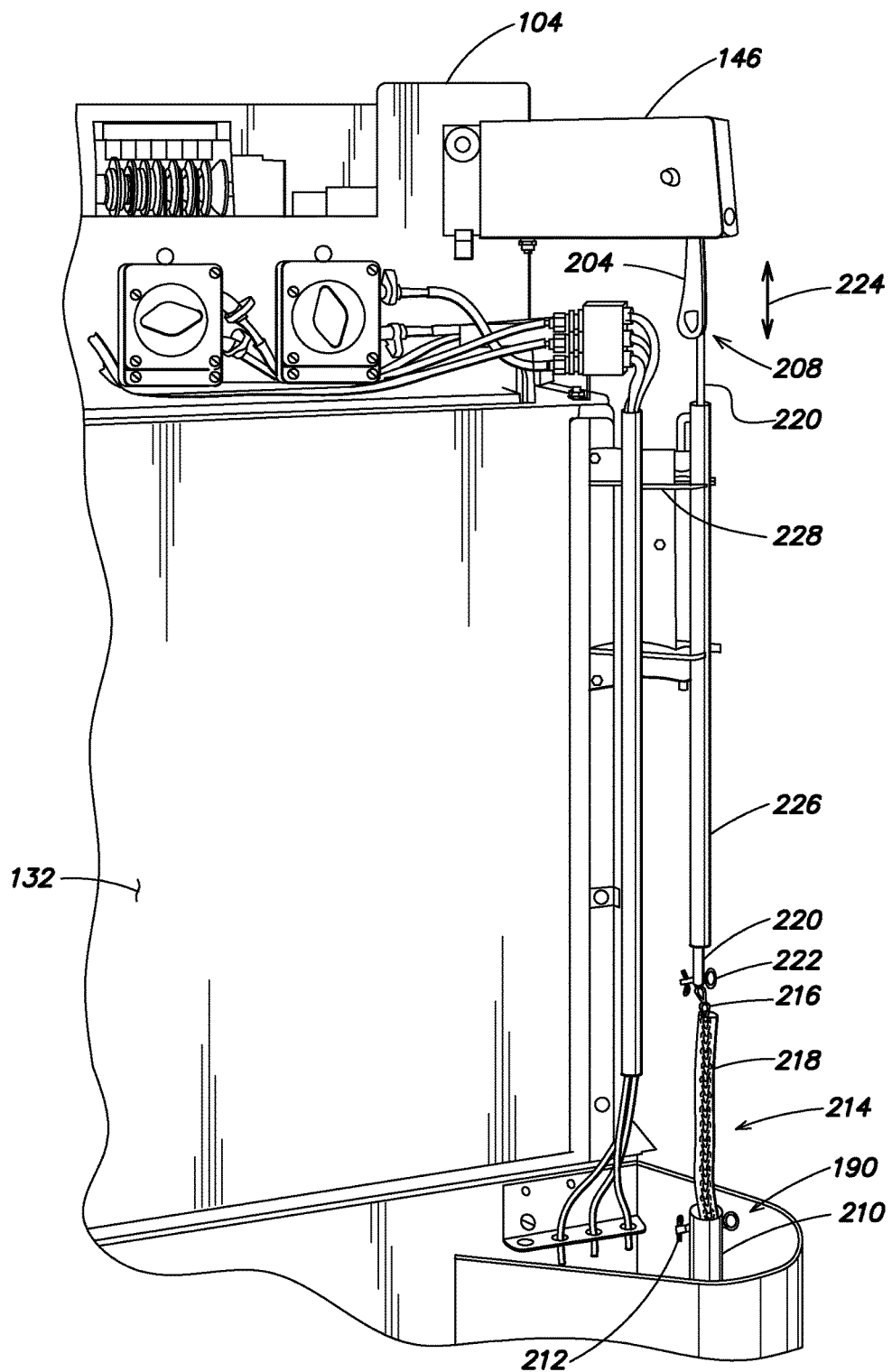
FIG. 10 is a partial perspective of an example drain assembly.

Link arm 204 may be connected to a linkage assembly at 208 and the drain plug assembly 190 may be connected to the linkage assembly. Referring to FIG. 10, the drain plug assembly 190 may include a drain plug 210 and an attachment device 212 for attaching the drain plug assembly 190 to a linkage assembly 214. The linkage assembly 214 may include a length of chain 216 and tensioner 218 (typically plastic tubing surrounding chain 216) for connection to the drain plug assembly 190 at a first end and for connection to a link-rod 220 at a second end using a suitable quick connector 222 that may be operated without tools. The link-rod 220 is also for connection to the lifter assembly 146 at 208 of link arm 204 and the lifter assembly 146 is also for connection to the drain mechanism 158. During operation, drain mechanism 158, through the drain lifter assembly, causes the drain plug 210 to move up and down, as indicated by arrow 224. Link-rod 220 may be contained within a tube 226 that is hung from bracket 228 connected to cabinet 132. The tube 226 may be removed from bracket 228 without tools to facilitate disassembly of the drain lifter assembly 146, the link-rod 220, the linkage assembly 214 and the drain plug assembly 190, if and when those parts need to be packaged within the housing 104 and returned for service and maintenance. The housing 104 may include structure for holding one or more of the drain plug assembly, the length of chain and tensioner, the link-rod, and the lifter assembly during shipping. The structure for holding these parts may be nothing more than sufficient space within housing 104 to accommodate the parts or housing 104 may have recesses and other holding structure (not shown) formed for receiving the parts to be inserted within housing 104. It is known that the caustic chemicals used for ware-washing cause deterioration of component parts such as the drain plug assembly 190 and linkage assembly 214 and therefore these parts may need to be periodically replaced. Conveniently, by attaching the component parts using connectors that may be operated without tools allows the drain plug assembly and other associated parts to be quickly disassembled and packaged within housing 104 for repair or replacement. Drain lifter assembly 146 because of the moving parts may occasionally need to be returned for repair or maintenance and therefore it may be attached to housing 104 using connectors that may be operated without tools so that it too may be packaged within housing 104.

Figure 11:
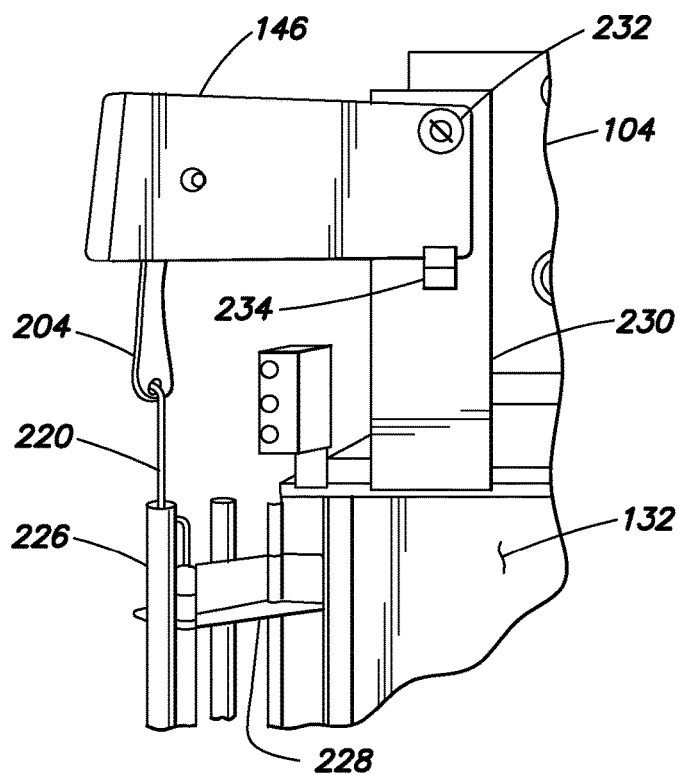
FIG. 11 is a partial perspective of an alternate example of a drain lifter assembly.

FIG. 11 shows an alternative example of mounting drain lifter assembly 146 to a bracket 230 attached permanently to cabinet 132 and not to housing 104. Bracket 230 still allows for the removal of lifter assembly 146 using connectors 232 and 234 in a similar manner described above with respect to connectors 116 and 118.

Figure 12:
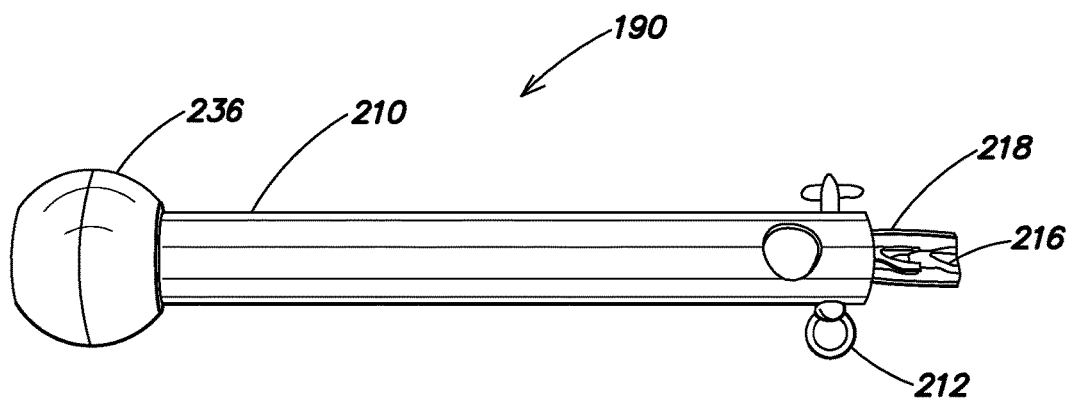
FIG. 12 is a partial elevation of an example drain plug assembly.

FIG. 12 shows an example drain plug assembly 190 including drain plug 210 and drain plug ball 236 with attachment device 212 connected to chain 216 and tensioner 218. Attachment device 212 may be any appropriate connector that may be used without tools such as the pull-pin shown, or for example a cotter pin, clevis pin, toggle pin, ball-lock quick-release device, a lynch pin, or any other acceptable connector.

Figure 13:
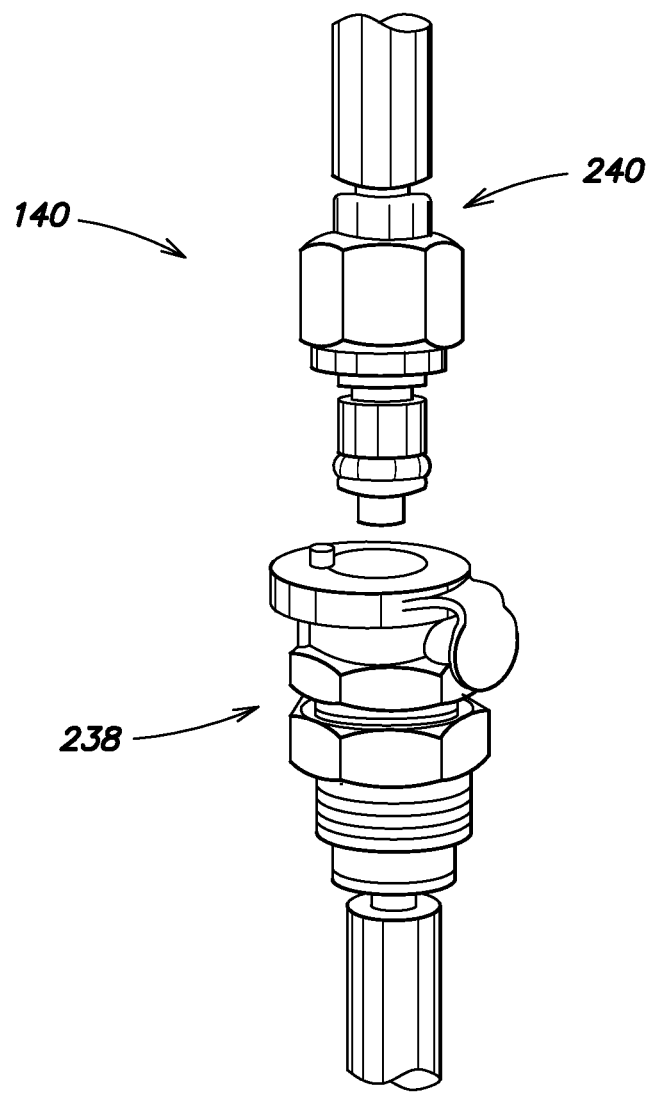
FIG. 13 is an exploded perspective of example chemical tubing connectors.

FIG. 13 shows an example chemical tube quick connector 140, with both mating parts 238, 240. The quick connector 140 may be any suitable connector that may be operated without tools that will reliably connect and transport chemicals. For example, connectors from Colder Products Company of St. Paul, Minn., part nos. 04-CPCPMC160212, 04-CPCPMC22-02-12, 04-CPCPMC170212, and 04-PMC4202 may be appropriate. As those skilled in the art will realize, there are numerous acceptable connectors that may be used, depending on design requirements.

Figure 14:
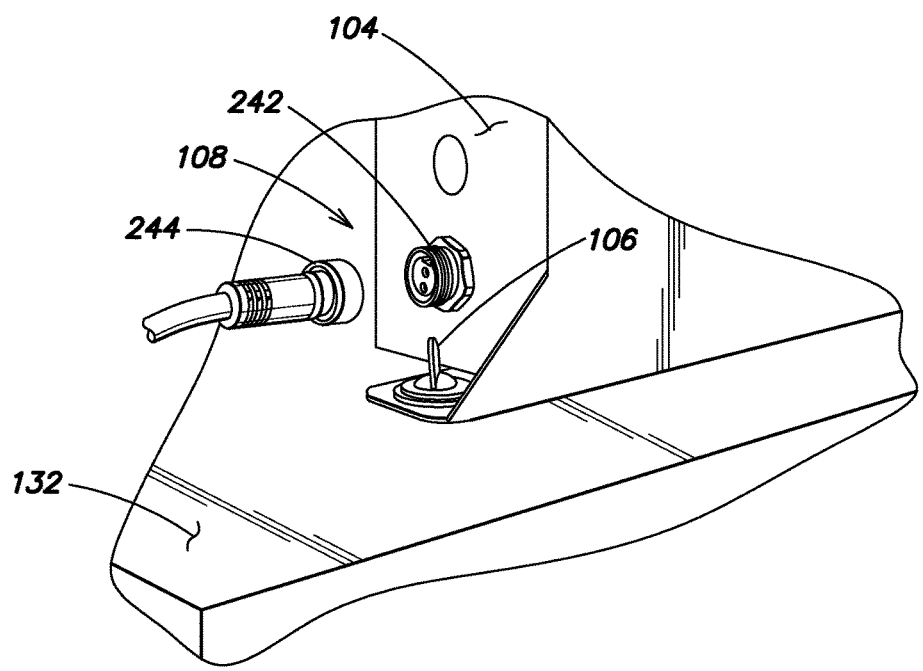
FIG. 14 is a partial perspective of an example electrical connector.

FIG. 14 shows an example electrical connector 108 for connecting a building's electrical power to housing 104 without the use of tools. In this example, connector 108 is a thread connector 242 that mates with threaded electrical cable 244. Electrical connector 108 may be any suitable connector that may be operated without tools. For example, electrical connectors from Mencom Corporation of Oakwood, Ga., part nos. MINW-3MP-6-SS, and MIN-3MR-3A-SS may be appropriate.

Figure 15:
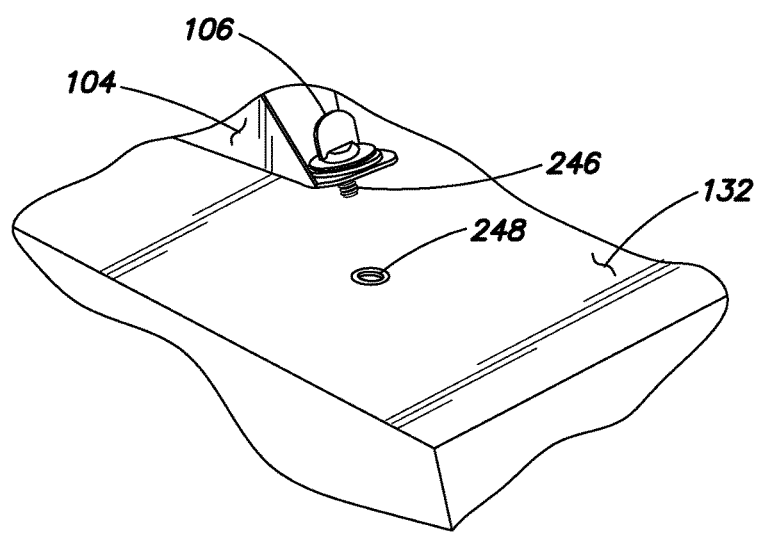
FIG. 15 is a partial perspective of an example housing connector.
Figure 16:
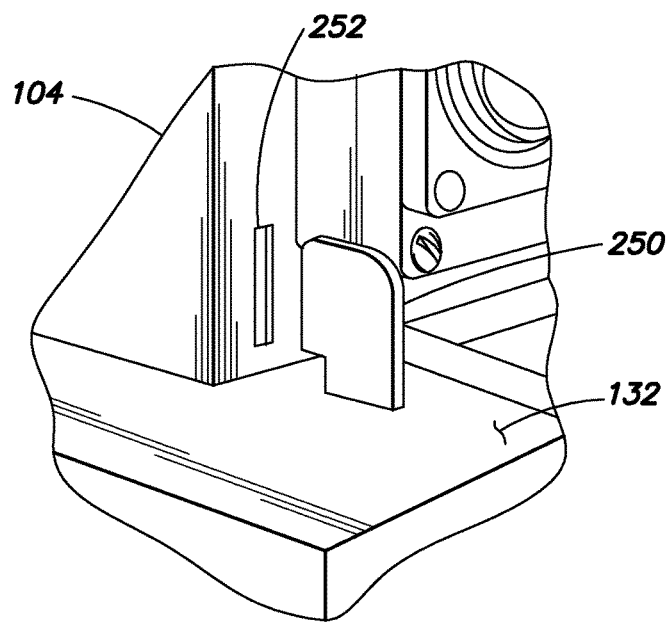
FIG. 16 is a partial perspective of an example housing locator tab and slot.

FIG. 14 also shows connector 106 that attaches housing 104 to cabinet 132. In this example connector is a wing-nut assembly but any appropriate connector that may be operated without tools would be sufficient. FIG. 15 shows housing 104 separated from cabinet 132 to expose threaded shaft 246 that mates with threaded recess 248 in cabinet 132. FIG. 16 shows an example connector that quickly and accurately aligns housing 104 to cabinet 132. Locking locating tabs 250 are attached to cabinet 132 and mate with locating slots 252 on housing 104. Together connectors 106 and locating tabs 250 allow housing 104 to quickly, easily, and accurately installed and removed from cabinet 132.

Figure 17:
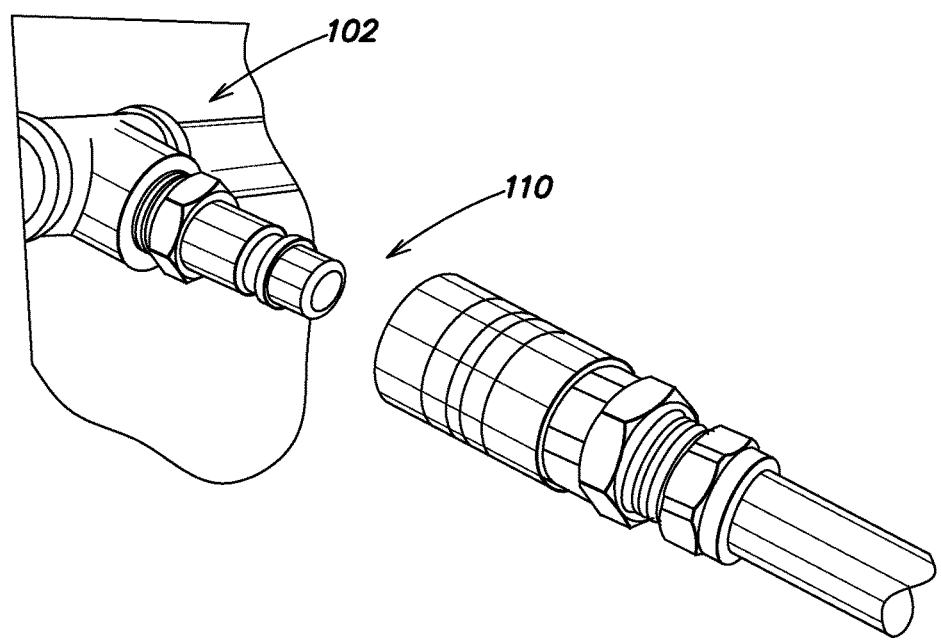
FIG. 17 is a partial perspective of an example water supply connector.

FIG. 17 shows an example quick connector 110 for connecting inlet water plumbing assembly 102 to a building's water supply. Any appropriate water coupling that may be operated without tools is acceptable. For example, plumbing connectors from Dixon Valve and Coupling Company, part no. 4FM4-S may be appropriate.

Figure 18:
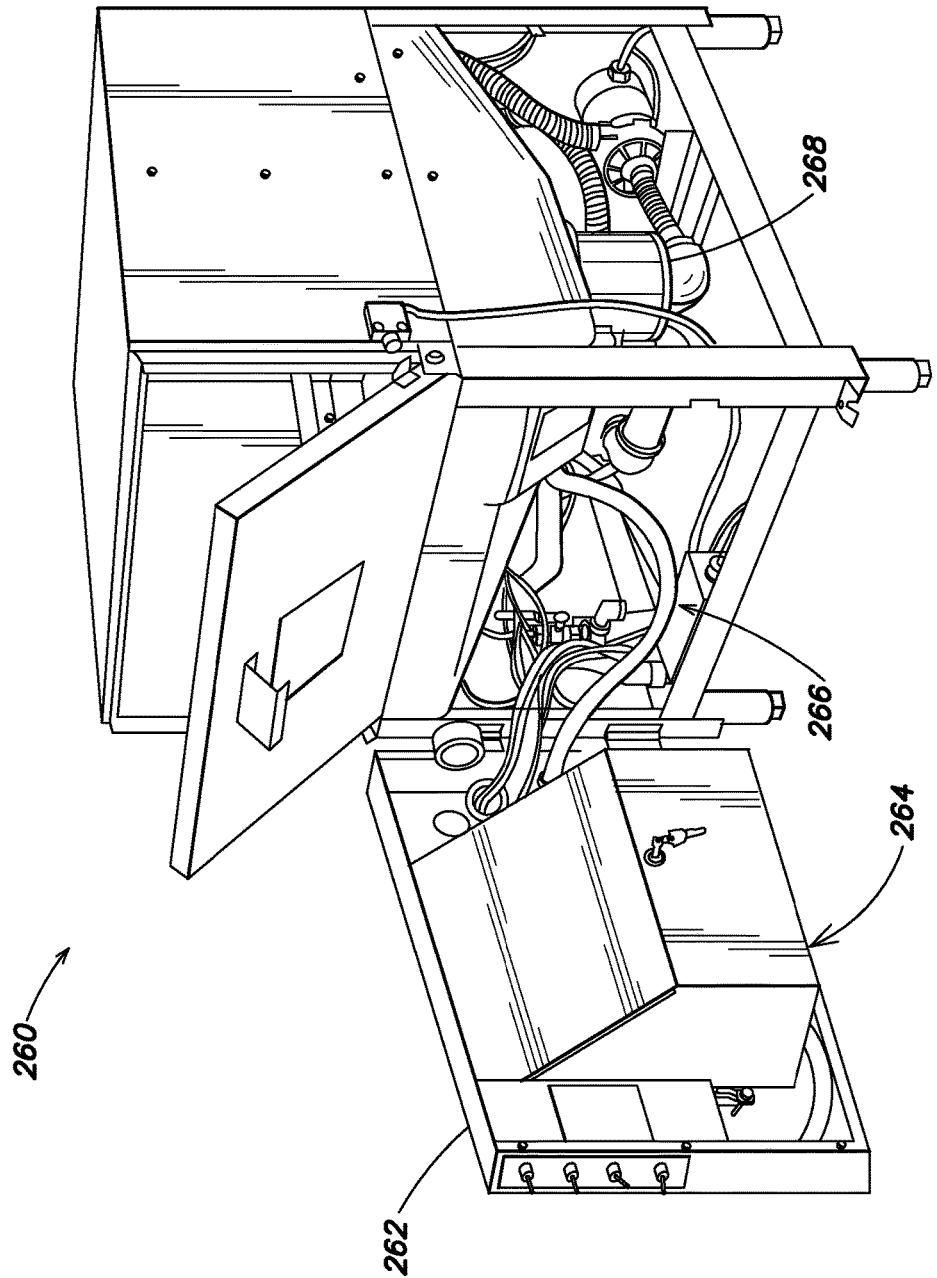
FIG. 18 is a perspective of another prior art ware-washer.

FIG. 18 is a perspective view of a prior art under-counter ware-washer 260 that includes a hinged door 262 that includes an attached control assembly 264. Control assembly 264 is very similar to control assembly 14 described above with respect to an upright ware-washer. The prior art ware-washer 260 also had parts that required predictable and frequent maintenance attached at various locations. For example, a plumbing assembly is shown generally at 266 and a drain mechanism and assembly (not shown for clarity) is attached to the sump/drain 268.

Figure 19:
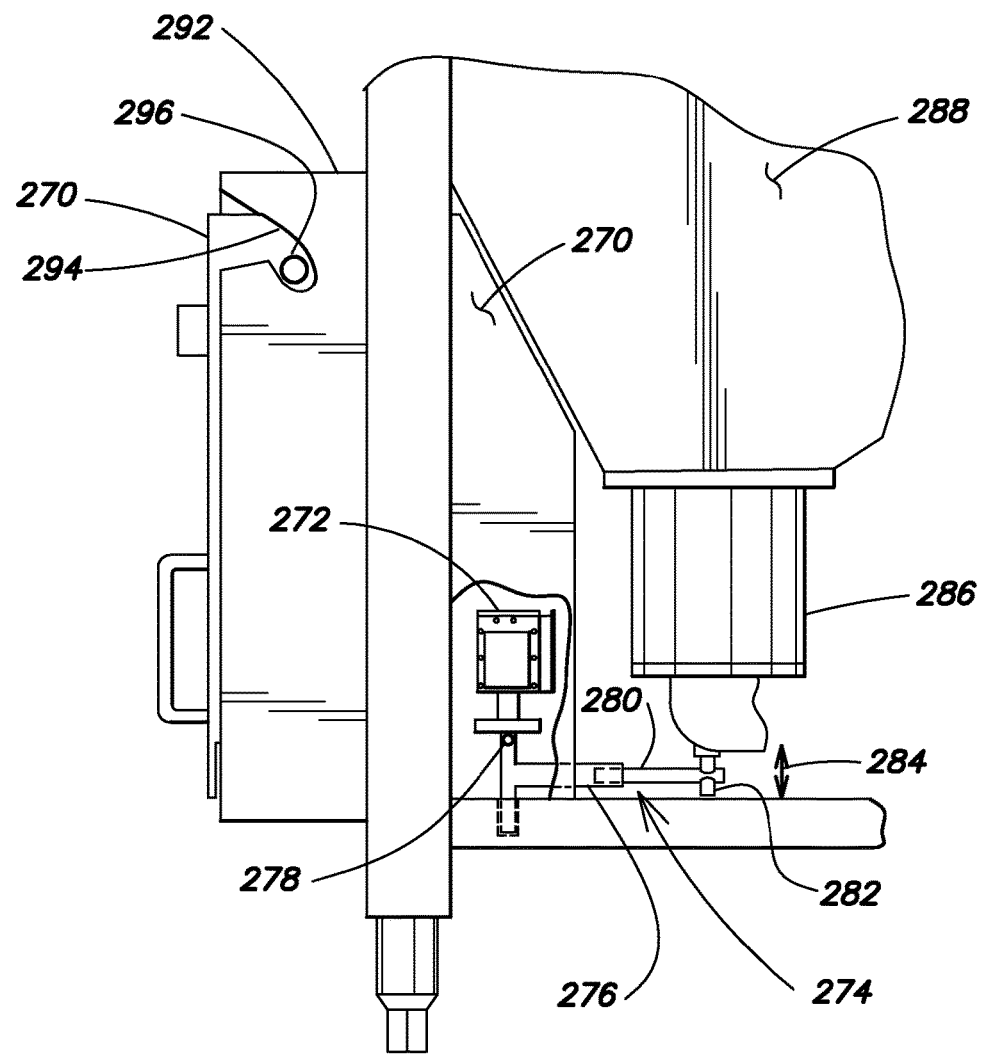
FIG. 19 is a partial elevation of an alternate control assembly.

FIG. 19 shows a partial elevation of an alternate embodiment of an under-counter control assembly or exchange head 270. Control assembly 270 is very similar to control assembly 100 described above. Control assembly 270 may include a drain mechanism 272 (shown in phantom, as it is contained within the assembly 270). Drain mechanism 272 may be the same as drain mechanism 158. Drain mechanism 272 may be connected to a linkage assembly 274 that, because of difference in design, is different structurally from linkage assembly 214 described above but having the same function to raise and lower a drain plug assembly. The example embodiment shows linkage assembly 274 formed by a T-shaped link arm 276 that is connected to drain mechanism 272 by a quick connector 278, such as a pull-pin as described above with respect to linkage assembly 214. Linkage assembly 274 may also include a rod 280 that is received within link arm 276 and connected to a drain plug assembly 282. Activation of drain mechanism 272 causes the drain plug assembly to raise and lower, as indicated at arrows 284. The lower T-portion of link arm 276 may slide within a slot or jacket to reduce any chances of the linkage assembly 274 jamming during use. The drain plug portion is not shown in FIG. 19, but is held within sump/drain 286 to fill and drain pan 288, as is known. Control assembly 270 also may include a water plumbing assembly (not shown) that is essentially the same as water plumbing assembly 102 described above and can be connected and disconnected without the use of tools. Control assembly 270 may be connected to the ware-washer at skirt 292 by anchor slot 294 and pin 296. Such an arrangement allows the control assembly 270 to be removed from the ware-washer without the use of tools for a quick and easy exchange with a replacement exchange head without the use of tools.

FIG. 20 shows an exploded partial perspective of another example of a quick connector 300 that may be operated without the use of tools. Connector provides the advantage of connecting and disconnecting all of the chemical lines at once, rather than one-at-a-time like those connectors described above. Connector 300 includes a female portion 302, a male portion 304, and a connector ring 306. Connector ring 306 mates with threads 308 for holding male portion 304 together with female portion 302, as shown in FIG. 21. Connector 300 may be keyed so that the male and female portions only connect in a single orientation to ensure that the correct chemical is supplied to the ware-washer. Connector 300 may replace the three separate connectors 140 and only require a single connection of tubes, rather than three connectors, as shown at 130 of FIG. 4. Similarly to the description above with respect to separate chemical connectors, female portion 302 will mate with a first manifold (not shown) attached to a ware-washer and male portion 304 will mate with a second manifold (not shown) attached to a ware-washer. In this way the chemical lines attached to the pumps of an exchange head can be coupled together to prevent chemical leakage during transportation of a removed exchange head to a service facility. The connector 300 shows connections for three chemical lines, but connections for more or fewer lines may be designed into a connector depending on the type of ware-washer.

Thus has been described a ware-washer control assembly with an exchange head housing including at least one housing connector for attaching the exchange head housing to a ware-washer cabinet, where the housing connector is operable without tools. Electrical control components may be contained within or attached to the exchange head housing, including at least one electrical connector for connecting the electrical control components to a source of electricity, where the electrical connector is operable without tools. A water plumbing assembly may be contained within or attached to the exchange head housing, including at least one plumbing connector for connecting the water plumbing assembly to a source of water, where the plumbing connector is operable without tools. A drain mechanism may be contained within or attached to the exchange head housing, including at least one drain connector for connecting the drain mechanism to a drain plug assembly, where the drain connector is operable without tools.

The ware-washer control assembly may also include at least one chemical dispensing unit contained within or attached to the exchange head housing, including at least one chemical connector for connecting the chemical dispensing unit to a source of a dishwashing chemical, where the chemical connector is operable without tools. The chemical connector may also include tubing for transporting the dishwashing chemical from the source to a dispensing location. The tubing may also include a dispensing connector for connection to the dispensing location, wherein the dispensing connector includes a mating connector to the chemical connector such that the chemical connector may be connected to the mating connector during shipping to prevent leakage of chemicals from the tubing.

The examples above may also be described with respect to a commercial ware-washer with an exchange head housing having at least one housing connector on an exterior of the exchange head housing. A cabinet of the ware-washer may include at least one surface having a mating housing connector for attachment with the housing connector such that the exchange head housing is attached to the cabinet without tools. Electrical control components may be contained within or attached to the exchange head housing, including at least one electrical connector for connecting the electrical control components to a source of electricity such that the electrical connector is operable without tools. A water plumbing assembly may be contained within or attached to the exchange head housing, including at least one plumbing connector for connecting the water plumbing assembly to a source of water such that the plumbing connector is operable without tools. A drain mechanism may be contained within or attached to the exchange head housing, including at least one drain connector for connecting the drain mechanism to a drain plug assembly such that the drain connector is operable without tools.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A ware-washer control assembly comprising:
    electrical components;
    an inlet water plumbing assembly;
    a drain mechanism;
    wherein each of the electrical components, inlet water plumbing assembly, and drain mechanism are contained within or attached to a housing for shipment and off-site service and distribution, the housing including at least a first connector for attaching the housing to a ware-washer cabinet and wherein the ware-washer control assembly further includes a plurality of connectors for connecting the electrical components and inlet water plumbing assembly to a corresponding supply source and for connecting the drain mechanism to a drain plug assembly; and
    wherein each of the first connector and the plurality of connectors are connected and disconnected by a user without tools.

2. The ware-washer control assembly of claim 1 further including at least one chemical dispensing unit contained within or attached to the housing and tubing for connection to a chemical source and to a chemical dispensing location, the tubing including connectors that are connected and disconnected by the user without tools.

3. The ware-washer control assembly of claim 2 wherein the tubing for connection to the chemical source includes a chemical connector and the tubing for connection to the chemical dispensing location includes a mating connector to the chemical connector such that the chemical and mating connectors may be connected to each other during shipping to prevent leakage of chemicals from the tubing.

4. The ware-washer control assembly of claim 2 wherein there are three chemical dispensing units wherein each of the chemical dispensing units are for dispensing one of a detergent, a sanitizer, and a rinse additive.

5. The ware-washer control assembly of claim 2 wherein the at least one chemical dispensing unit is a peristaltic pump.

6. The ware-washer control assembly of claim 1 wherein the electrical components include one or more of a wire harness, a timer, an indicator light, a user-activated switch, a counter, a door cut-off switch, and an auto-start actuator.

7. The ware-washer control assembly of claim 1 wherein the inlet water plumbing assembly includes at least a line strainer and a water supply solenoid valve.

8. The ware-washer control assembly of claim 7 wherein the inlet water plumbing assembly further includes a manual water shut-off valve.

9. The ware-washer control assembly of claim 1 wherein at least a portion of the inlet water plumbing assembly is separated from the electrical components by a barrier to prevent water leakage from damaging the electrical components.

10. The ware-washer control assembly of claim 9 wherein at least a water supply solenoid valve forms a part of the inlet water plumbing assembly and wherein the water supply solenoid valve is positioned adjacent the electrical components within the housing.

11. The ware-washer control assembly of claim 1 wherein the drain mechanism includes a linear solenoid actuator.

12. The ware-washer control assembly of claim 1 wherein the drain plug assembly includes at least a drain plug and an attachment device for attaching the drain plug to a linkage assembly.

13. The ware-washer control assembly of claim 12 wherein the linkage assembly includes a length of chain and tensioner for connection to the drain plug assembly at a first end and for connection to a link-rod at a second end, wherein the link-rod is also for connection to a lifter assembly and the lifter assembly is also for connection to the drain mechanism.

14. The ware-washer control assembly of claim 13 wherein the housing includes structure for holding one or more of the drain plug assembly, the length of chain and tensioner, the link-rod, and the lifter assembly during shipping.

* * * * *